(12) United States Patent
Forlenza et al.

(10) Patent No.: US 7,016,898 B1
(45) Date of Patent: Mar. 21, 2006

(54) EXTENSION OF BROWSER WEB PAGE CONTENT LABELS AND PASSWORD CHECKING TO COMMUNICATIONS PROTOCOLS

(75) Inventors: Randolph Michael Forlenza, Austin, TX (US); Miguel Sang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,966

(22) Filed: Apr. 14, 2000

(51) Int. Cl.
*G06F 17/30* (2006.01)

(52) U.S. Cl. .............. 707/10; 707/8; 707/9; 709/225; 709/229

(58) Field of Classification Search .......... 707/8, 707/9, 10, 100, 3, 530; 709/225, 229, 102; 713/200
See application file for complete search history.

(56) References Cited

U.S. PATENT DOCUMENTS

| | | | |
|---|---|---|---|
| 5,052,040 A | 9/1991 | Preston et al. ............. | 380/4 |
| 5,590,266 A | 12/1996 | Carson et al. ............. | 395/340 |
| 5,778,367 A | 7/1998 | Wesinger, Jr. et al. ...... | 707/10 |
| 5,911,043 A * | 6/1999 | Duffy et al. ............... | 709/203 |
| 5,953,419 A | 9/1999 | Lohstroh et al. ........... | 380/21 |
| 5,987,606 A | 11/1999 | Cirasole et al. ........... | 713/200 |
| 6,163,844 A * | 12/2000 | Duncan et al. | |
| 6,185,551 B1 * | 2/2001 | Birrell et al. ............. | 707/3 |
| 6,304,886 B1 * | 10/2001 | Bernardo et al. ........... | 707/530 |
| 6,336,117 B1 * | 1/2002 | Massarani ................. | 707/100 |
| 6,363,375 B1 * | 3/2002 | Hoshino et al. ............. | 707/3 |
| 6,438,574 B1 * | 8/2002 | Nagashima ................. | 709/102 |
| 6,510,458 B1 * | 1/2003 | Berstis et al. ............. | 709/219 |

OTHER PUBLICATIONS

Internet Content Rating Association, <http://www.icra.org/about/>, pp. 1-6.*
IDG Books Worldwide, Inc., Internet Explorer 4 for Windows for Dummies, pp. 102-175.*
Hypertext Transfer Protocol—HTTP/1.1, <http://www.w3.org/Protocols/rfc2616/rfc2616.html>.*
Internet Relay Chat Protocol, <http://www.cis.ohio-state.edu/cgi-bin/rfc/rfc1459.html>.*

(Continued)

*Primary Examiner*—Shahid Alam
*Assistant Examiner*—Hung Pham
(74) *Attorney, Agent, or Firm*—Marilyn Smith Dawkins; Dillon & Yudell LLP

(57) ABSTRACT

Content label categories and associated user restrictions for desired access control may be entered by a privileged user in any communications programs (such as a browser) within a system, and are automatically distributed to all other communications programs (such as a different browser or a newsreader) within the system regardless of whether the same communications protocol is utilized. Communications programs being installed check for access control settings within other communications programs or via a common API in a centrally located operating system access control support function, and employ such settings in configuring internal access controls. Content-based access control is thus implemented uniformly across the system without work arounds being available to the nonprivileged users. Content labels for requested content, which may be embedded within the requested content, contained within a communications header for transactions bearing the requested content, or looked up in internal or external databases utilizing an identifier for the requested content, are checked against content label categories restricted for a current user. If restricted content is detected, the user is prompted for a password before the requested content is displayed.

3 Claims, 3 Drawing Sheets

OTHER PUBLICATIONS

ICRA Launches New System to Make the Internet Safer for Children; http://www.icra.org/press/en_p12.shtml; Dec. 13, 2000.

ICRA—The Internet Content Rating Association; Project Interconnect; http://projectinterconnect.org/filters/icra.htm; last modified Sep. 15, 2003.

Bingham, M.; Mengel, L.; Microsoft Chat Guide; LInC Leaders; http://www-ed.fnal.gov/lincon/tech_com_mschat.shtml; created Jun. 29, 1998; updated Dec. 14, 2000.

ICRA filtering using Microsoft Internet Explorer; Intranet Content Rating Association; http://www.icra.org/faq/contentadvisor/; printed on Jan. 22, 2004.

Microsoft Chat README, Microsoft Corporation; Jun. 1998.

Smith, J.; Accessibility on Online Chat Programs; WebAIM; http://www.webaim.org/techniques/articles/chats, 2002.

Swick, R.R.; Platform for Internet Content Selection; http://www.w3.org/PICS/; http://www.w3.org/PICS; W3C; Oct. 22, 2003.

* cited by examiner

EXTENSION OF BROWSER WEB PAGE CONTENT LABELS AND PASSWORD CHECKING TO COMMUNICATIONS PROTOCOLS

BACKGROUND OF THE INVENTION

1. Technical Field

The present invention relates generally to data access control in data processing system networks and in particular to content-specific access control. Still more particularly, the present invention relates to extending existing content-specific access control mechanisms for Web pages to other communications protocols.

2. Description of the Related Art

Conventional data access control is based on restricting access to specific servers, storage media (e.g., hard disk drives), directories, or files regardless of their content. That is, access to content is controlled by restricting access to the location of the content, such as by preventing a user from accessing (retrieving and viewing or executing) a file (or datastream) containing the content, rather than being based on the content itself. This type of access control generally involves setting file attributes within the file system or an access control list. However, such access control techniques are poorly suited for contemporary large scale publication of content on the Internet, where filenames (or streaming sources) are often generated electronically along with the content, and where content is frequently updated, so that tracking filenames for content to be restricted is extremely complicated. It is also impossible for an individual unaware of the content of particular files to determine whether access to such files should be restricted.

There currently exists, for HyperText Transmission Protocol (HTTP) based systems, the ability for browsers to regulate, control and restrict the browsing of Web page content according to classifications contained in the content labels embedded in web pages. The content labels within a HyperText Markup Language (HTML) document, for example, are contained within a META tag for the document:

```
<META http-equiv="PICS-Label" content=' (PICS-1.1
    <service url> [option. . .]
    labels   [option. . .] ratings (<category> <value>. . .)
             [option. . .] ratings (<category> <value>. . .)
             . . .
    <service url> [option. . .]
    labels   [option. . .] ratings (<category> <value>. . .)
             [option. . .] ratings (<category> <value>. . .)
    . . .
    . . .)'>
```

The "PICS-1.1" reference is to a version of the content-labeling/rating protocol established by the Platform for Internet Content Selection, a working group affiliated with the World Wide Web Consortium (W3C). The protocol is described in greater detail at www.w3.org/PICS. Under this system, content labels are employed for either self-labeling by the content publisher or labeling by a rating service such as the Internet Content Rating Association (www.irca.org).

Content labels for HTML documents may be transmitted within the HTML document, with the HTML document in an HTTP (or other RFC-822-style protocol) header, or separately from the HTML document from a "label bureau," which is typically just an off-the-shelf HTTP server running a special Common Gateway Interface (CGI) script. The labels from a label bureau may refer to any document that has an associated Uniform Resource Locator (URL), including those available through protocols other than HTTP, such as File Transfer Protocol (FTP), Gopher, or NetNews (see RFC-1738).

HTTP content labels are most frequently employed in filtering systems, such as those integrated with browsers to prevent children from inadvertently accessing sexually explicit or graphically violent material. Access to certain types of content identified by content label may be restricted. Privileged users of a system assign passwords to certain content label categories and non-privileged users must supply the correct password to view a web page containing content encompassed by a restricted category.

Content-specific filtering is generally only enabled within the HTTP engine of a browser. Where only the browser on a system employs content-based filtering, it is possible for users to bypass the intent of the content restrictions when accessing non-HTTP data which does not contain content labels, or by utilizing non-HTTP protocols which do not support content restriction. For example, a user may retrieve binary image data containing sexually explicit content utilizing the FTP engine of a browser which does not provide content-based access control for non-HTTP protocols, or receive similar content as an attachments to an electronic mail message. Alternatively, a non-privileged user may simply utilize the Network News reader program which is normally distributed with browsers. Even if the newsreaders supports content label-based access control, the privileged user (e.g., a parent) may not be sufficiently familiar with the Internet to understand that news groups also may contain sexually explicit or other undesirable material. These simple work-arounds can render existing browser content control methodologies ineffective.

It would be desirable, therefore, to allow privileged users, via password assignment, to further regulate, control, and restrict non-privileges user's ability to access, import, and export data external to the system or data within the system.

SUMMARY OF THE INVENTION

It is therefore one object of the present invention to provide improved data access control in data processing system networks.

It is another object of the present invention to provide improved content-specific data access control in data processing system networks.

It is yet another object of the present invention to extend existing content-specific data access control mechanisms for Web pages to other communications protocols.

The foregoing objects are achieved as is now described. Content label categories and associated user restrictions for desired access control may be entered by a privileged user in any communications programs (such as a browser) within a system, and are automatically distributed to all other communications programs (such as a different browser or a newsreader) within the system regardless of whether the same communications protocol is utilized. Communications programs being installed check for access control settings within other communications programs, and employ such settings in configuring internal access controls. Content-based access control is thus implemented uniformly across the system without work arounds being available to the nonprivileged users. Content labels for requested content, which may be embedded within the requested content, contained within a communications header for transactions bearing the requested content, or looked up in internal or external databases utilizing an identifier for the requested content, are checked against content label categories restricted for a current user. If restricted content is detected, the user is prompted for a password before the requested content is displayed.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
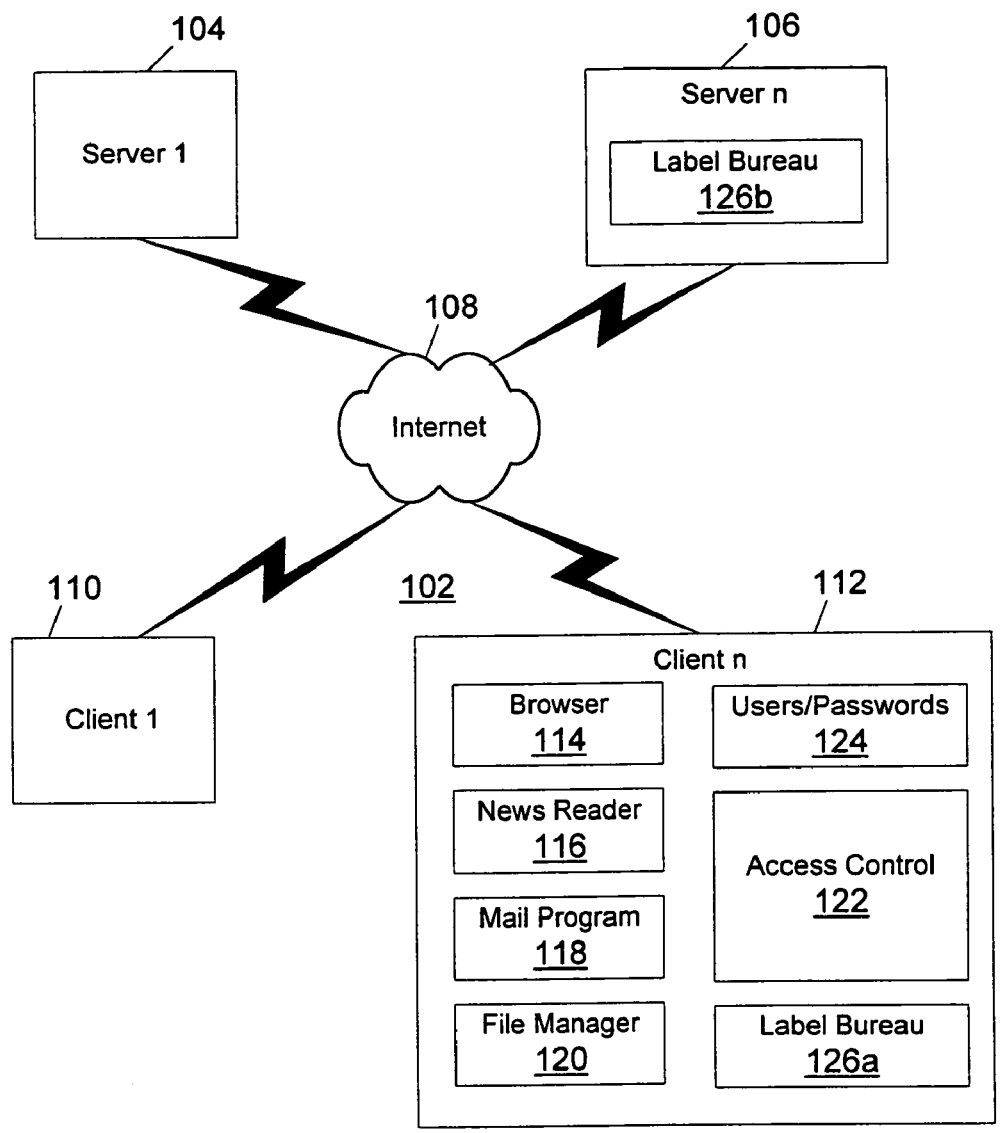
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. Data processing system network 102 includes one or more servers 104–106 which are accessible as part of the Internet 108 or other network. Data processing system network 102 also includes one or more clients 110–112 which may access or receive content from servers 104–106. The content may be transmitted using any of a variety of protocols including HyperText Transfer Protocol (HTTP), File Transfer Protocol (FTP), an electronic mail protocol such as IMAP or POP, or a local file system.

In accordance with the present invention, a client within data processing system network 102 such as client 112 includes functionality supporting different communications protocols for transmitting content, including a browser 114 (for HTTP communications), a news reader 116 (for Network News Transfer Protocol or NNTP communications), a mail program 118 (for IMAP or POP communications), and a file manager 120 (for local file storage and retrieval). Although depicted in the exemplary embodiment as discrete function units, the functionality may be fully or partially integrated. For example, Netscape Navigator, available from AOL, Inc., includes browser, news reader, and mail functionality. Similarly, Internet Explorer, available from Microsoft Corporation, is tightly integrated with Windows Explorer, the file manager for the Windows 95, Windows 98, and Windows 2000 operating systems, and also include support for mail functionality, although news reading is provided in a different program, Outlook Express. Additionally, other communications protocols such as gopher or WAIS may be supported within client 112.

Also included within client 112 in the exemplary embodiment is an access control module 122, a browser-based facility of the type similar to those associated with existing browser programs which permits a privileged user to regulate the accessibility of content label categories according to passwords assigned by the privileged user. In the present invention, however, the access control module 122 provides a single interface for establishing regulation of all communications protocols supported within client 112, not merely the browser or HTTP client. All communications protocols supported within client 112 (e.g., HTTP, FTP, NNTP, instant messaging protocol(s), MP3 or other media and/or streaming data player(s), and the operating system file system in the exemplary embodiment) provide access control based on content labels. Access control module 122 provides a single interface to all communications protocols supported within the system, allowing a privileged user to set content label-based access restrictions for all communications protocols supported within the system. The access control module 122 need not be browser-based as implemented within the exemplary embodiment. Instead, the access control mechanism and the associated user interface for setting access restrictions could be an integral part of the operating system, or part of a separate application.

To facilitate content-based access control, client 112 also includes user identifiers and passwords 124, as well as a "label bureau" 126a. Label bureau 126a provides content labels for locally stored content identified by filename, and may be part of the operating system file system, a simple table maintained separately from the file system, or some other implementation. Similar label bureau(s) 126b are located on content-servers accessible to client 112, and provide content labels for content accessed by client 112 through the Internet 108 and identified by a uniform resource locator (URL).

Content labels for content accessed by client 112 may be determined in any of a variety of different manners. Content labels are preferably stored within or in association with content as metadata. For HTML content, existing content labeling may be employed. For other types of content, such as binary image data, content labeling may be implemented within comment or header portions of the content files. Alternatively, content labels may be maintained outside the files containing the content, either as an attribute of the file, metadata for the file, or simply within a separate file for content labels or as an attribute of the communications program. The content labels may then be transmitted within a header for a communications transaction utilized to transmit the content. Finally, content labels may be stored completely separate from the content in association with an identifier for the content, such as at label bureaus, and retrieved in a separate communications transaction from the content.

Figure 2:
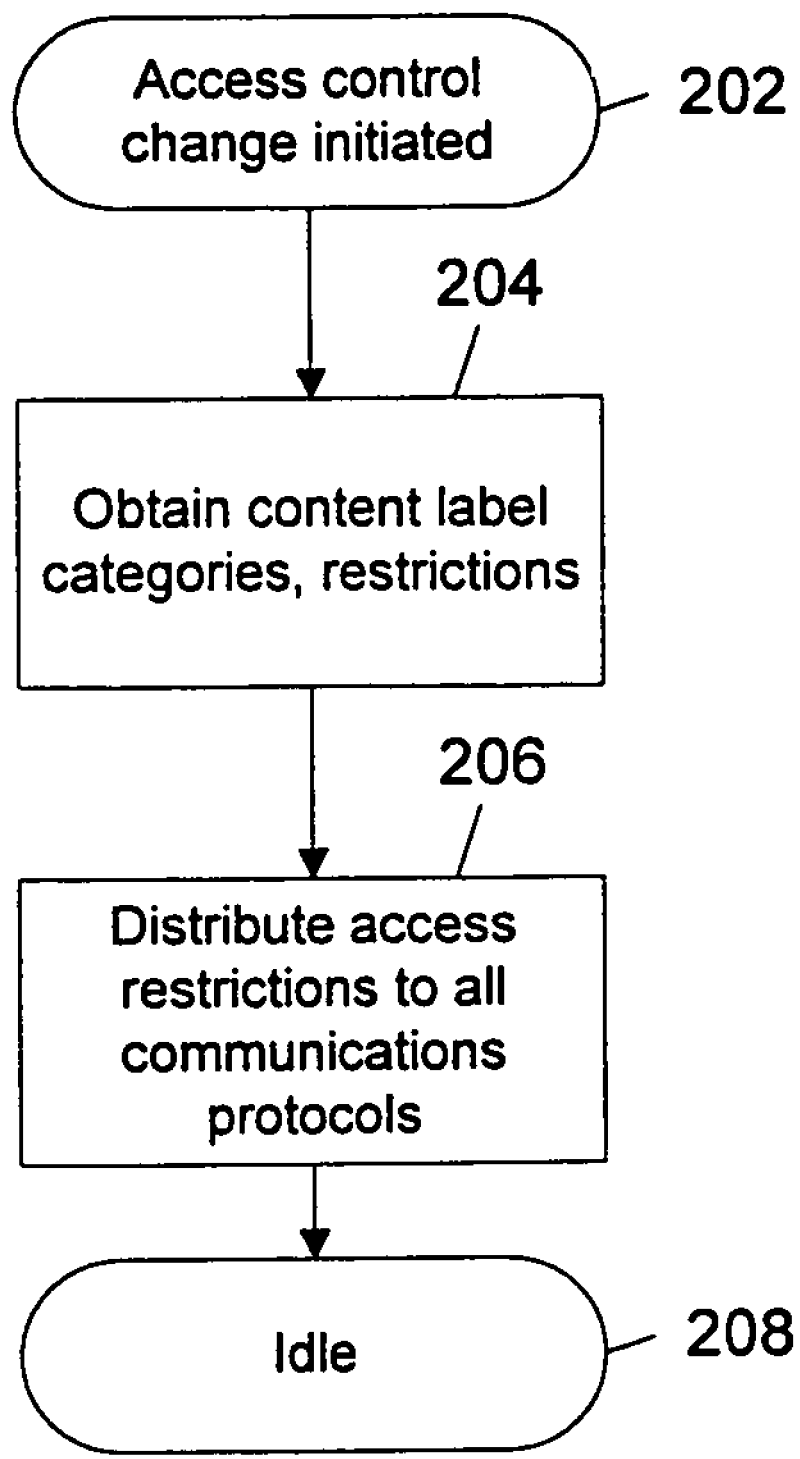
FIG. 2 is a high level flow chart for a process of setting access control based on content labels in accordance with a preferred embodiment of the present invention.

With reference now to FIG. 2, a high level flow chart for a process of setting access control based on content labels in accordance with a preferred embodiment of the present invention is illustrated. The process begins at step 202, which depicts an access control change being initiated by a privileged user. Verification of the identify of the privileged user (e.g., through a password prompt and check or simply by determining the current user) may optionally be undertaken at this time. The process first passes to step 204, which illustrates obtaining the content label categories and associated restrictions which define the access control desired for various nonprivileged users. This may be performed using the same user interface dialogs which are currently employed by browsers for setting content label-based restrictions for browsers (e.g., by clicking "Tools", "Internet Options", "Content" for Internet Explorer 5.0).

Once the content label categories and associated user restrictions for the desired access control are obtained, the process then passes to step 206, which depicts distributing the content label categories and restrictions to all software modules supporting a communications protocols within the system, including FTP, NNTP, instant messaging, SNMP, and other communications protocols. Each communications engine within the system is adapted to receive access control specifications in the form of content label categories and associated user restrictions, and implementing the appropriate access control. By obtaining the content label categories and restrictions once and distributing them among all communications programs within the system, uniform implementation of access controls may be provided with no simple work-arounds such as those which exist in the current systems.

Alternatively, content-based restrictions could be implemented through a central source in the operating system, which each communications protocol engine calls with a set of parameters and requests GO/NO GO clearance on access. Thus, an API would be provided to an "access check" which all executable code within the system could employ.

Additionally, the content label categories and associated user restrictions are distributed to all communications programs, regardless of the communications protocols employed or when they are installed. Thus, for example, the situation may be avoided in which a parent sets access restrictions for a child for an Internet Explorer Browser installed within the system, but the child subsequently downloads and installs a Netscape Navigator browser on the system to circumvent the restrictions. Communications programs which are installed on the system check for existing access control restrictions set for other communications programs. The process then proceeds to step 208, which illustrates the process becoming idle until another access control change is initiated.

Figure 3:
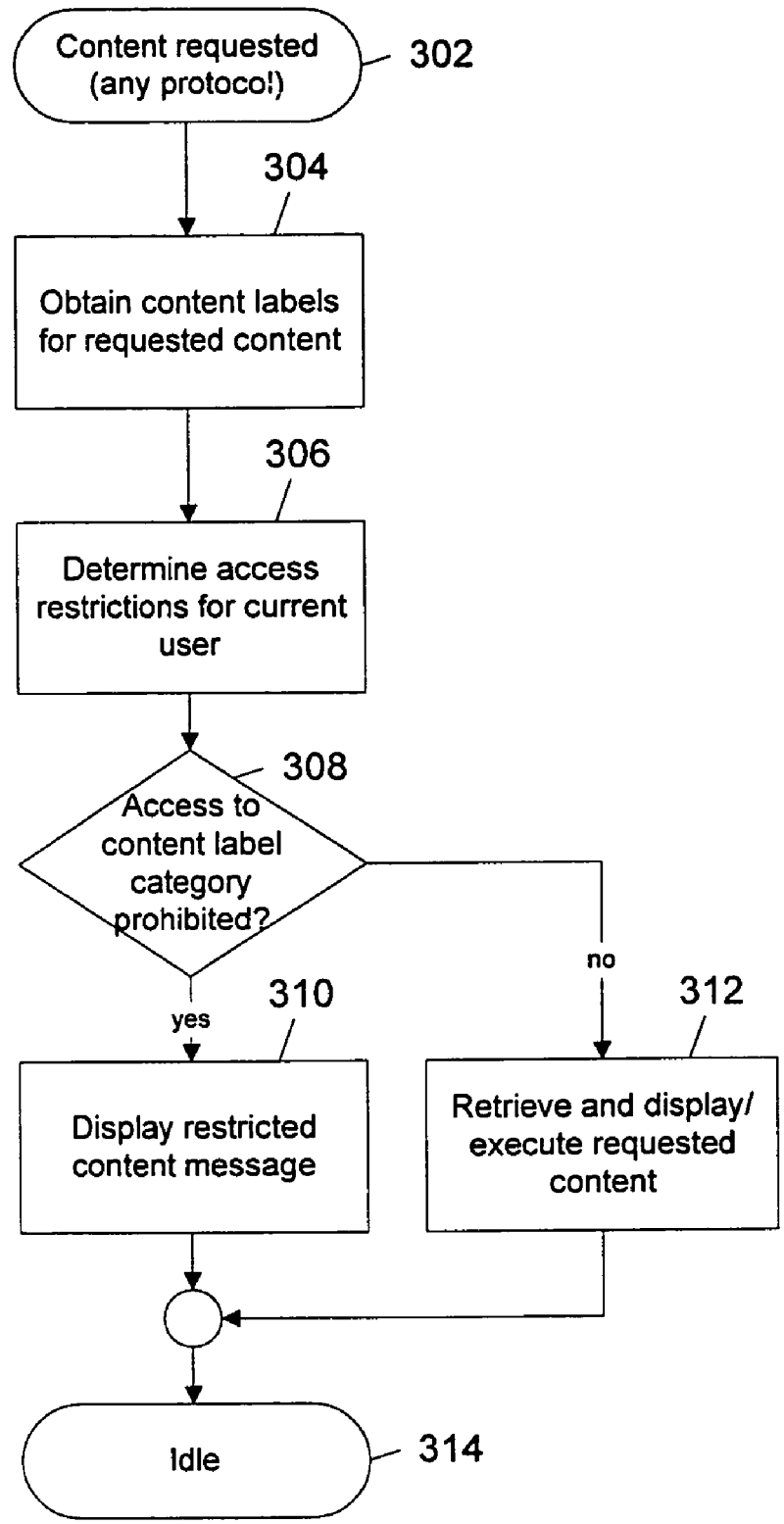
FIG. 3 depicts a high level flowchart for a process of performing access control in accordance with a preferred embodiment of the present invention.

With reference now to FIG. 3, a high level flowchart for a process of performing access control in accordance with a preferred embodiment of the present invention is depicted. The process begins at step 302, which depicts content being requested within a system, utilizing any communications protocol supported by the system, not just a browser employing the HTTP protocol. The process then passes to step 304, which illustrates obtaining content labels for the requested content. As noted above, the content labels may be embedded within the content itself, contained within a communications header for a client-server or similar transaction involved in transmitting the requested content, or looked up in an internal or external database containing content labels for uniquely identified content including the requested content.

The process passes next to step 306, which depicts determining the access restrictions, based on content label categories, which are applicable to a current user. This may optionally involve prompting the user for a password to verify the user's identity or to determine when the user logs onto the system, or may simply entail determining the current user and looking up the access restrictions associated with that user. The process then passes to step 308, which illustrates a determination of whether access to the content label categories including content labels for the requested content is prohibited to the current user. If so, the process proceeds to step 310, which depicts displaying a restricted content message to the user. If not, however, the process proceeds instead to step 312, which illustrates retrieving and displaying the requested content. Display of the requested content may involve playback of audio or video information.

From either of steps 310 or 312, the process then passes to step 314, which depicts the process becoming idle until content is again requested via any communications protocol supported within the system.

The present invention allows content-based access control to be readily implemented and uniformly effected across all communications protocols supported by a system. Changes to access restrictions based on content need only be entered by a privileged user once, and are distributed to all communications programs within the system for implementation. Thus, a parent setting access control restrictions for their child in a browser (e.g., Internet Explorer) will have the same access control restrictions automatically set for a newsreader (e.g., Outlook Express) even if the parent is unaware of the existence of the newreader. Communications programs which are later installed check for access restrictions during installation, for example, by checking other communications programs already installed on the system.

The present invention allows restriction over access to content, which includes execution of code as well as retrieval and viewing. Control may be provided over all forms of data, whether in files or datastreams or responses to real time requests. Content labeling-based access control may be employed in accordance with the present invention through SmartCards, credit cards, badges, etc. content labeling restrictions for the user of that device.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of establishing access control within a data processing system, comprising:

obtaining content label categories at the data processing system that present a unique label identifying the type of content for each respective category of a plurality of categories; Obtaining associated user restrictions at the data processing system defining at least one user's access privileges to each respective category of the plurality of categories as a function of the content label categories;

distributing the obtained content label categories and obtained associated user restrictions to each of a plurality of communications programs within the data processing system, wherein at least two of the communications programs employ different communications protocols;

setting access controls for at least two of the communications programs within the data processing system that employ different communications protocols as a function of the content label categories and associated user restrictions; and during installation of a communications program subsequent to setting access controls for each communications program within the data processing system as a function of the content label categories and associated user restrictions checking for existing access control settings for other communications programs and setting access controls for the communications program being installed utilizing the existing access control settings.

2. A system for establishing access control within a data processing system, comprising:

means for obtaining content label categories at the data processing system that present a unique label identifying the type of content for each respective category of a plurality of categories;

means for obtaining associated user restrictions at the data processing system defining at least one user's access privileges to each respective category of the plurality of categories as a function of the content label categories;

means for distributing the obtained content label categories and obtained associated user restrictions to each of a plurality of communications programs within the data processing system, wherein at least two of the communications programs employ different communications protocols;

means for setting access controls for at least two of the communications programs within the data processing system that employ different communications protocols as a function of the content label categories and associated user restrictions; and means operable during installation of a communications program subsequent to setting access controls for each communications program within the data processing system as a function of the content label categories and associated user restrictions for checking for existing access control settings for other communications programs and for setting access controls for the communications program being installed utilizing the existing access control settings.

3. A computer program product within a computer usable medium for establishing access control within a data processing system, comprising:

instructions for obtaining content label categories at the data processing system that present a unique label identifying the type of content for each respective category of a plurality of categories;

Instructions for obtaining associated user restrictions at the data processing system defining at least one user's access privileges to each respective category of the plurality of categories as a function of the content label categories;

instructions for distributing the obtained content label categories and obtained associated user restrictions to each of a plurality of communications programs within the data processing system, wherein at least two of the communications programs employ different communications protocols;

instructions for setting access controls for at least two of the communications programs within the data processing system that employ different communications protocols as a function of the content label categories and associated user restrictions; and instructions executed during installation of a communications program subsequent to setting access controls for each communications program within the data processing system as a function of the content label categories and associated user restrictions for checking for existing access control settings for other communications programs and for setting access controls for the communications program being installed utilizing the existing access control settings.

* * * * *